US009660502B2

(12) United States Patent
Matsuki et al.

(10) Patent No.: US 9,660,502 B2
(45) Date of Patent: May 23, 2017

(54) COOLING SYSTEM FOR ELECTRIC MOTOR WITH INTERNAL SHAFT PASSAGE AND COOLING MEDIUM RESERVOIR

(71) Applicant: Komatsu Ltd., Tokyo (JP)

(72) Inventors: Yasuhiko Matsuki, Fujisawa (JP); Akira Minamiura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 126 days.

(21) Appl. No.: 14/233,262

(22) PCT Filed: Oct. 19, 2012

(86) PCT No.: PCT/JP2012/077065
§ 371 (c)(1),
(2) Date: Jan. 16, 2014

(87) PCT Pub. No.: WO2014/049888
PCT Pub. Date: Apr. 3, 2014

(65) Prior Publication Data
US 2015/0015099 A1 Jan. 15, 2015

(30) Foreign Application Priority Data
Sep. 25, 2012 (JP) .................................. 2012-211472

(51) Int. Cl.
*H02K 9/19* (2006.01)
*H02K 9/00* (2006.01)
(Continued)

(52) U.S. Cl.
CPC ................ *H02K 9/00* (2013.01); *H02K 1/32* (2013.01); *H02K 9/19* (2013.01); *H02K 9/193* (2013.01); *H02K 11/225* (2016.01); *H02K 11/21* (2016.01)

(58) Field of Classification Search
CPC .. H02K 9/00; H02K 11/0031; H02K 11/0015; H02K 9/193; H02K 1/32; H02K 9/19
(Continued)

(56) References Cited

U.S. PATENT DOCUMENTS 4,915,793 A * 4/1990 Chou ....................... B01D 3/04
159/27.1
8,203,241 B2 6/2012 Tanaka
(Continued)

FOREIGN PATENT DOCUMENTS

JP 2007-020337 A 1/2007
JP 2009-022145 A 1/2009
(Continued)

OTHER PUBLICATIONS

WO 2011158685 English Translation.*
International Search Report dated Jan. 15, 2013, issued for PCT/JP2012/077065.

*Primary Examiner* — Terrance Kenerly
*Assistant Examiner* — Alexander Moraza
(74) *Attorney, Agent, or Firm* — Locke Lord LLP

(57) ABSTRACT

A motor includes: a shaft to which a rotor is attached and having an internal cooling medium passage in an inside of the shaft, a cooling medium passing through the internal cooling medium passage; a housing including the shaft disposed therein and configured to rotatably support the shaft; and a cooling medium reservoir provided in the housing and provided on an upstream side of an inlet of the internal cooling medium passage in a flowing direction of the cooling medium, the cooling medium reservoir being configured to store the cooling medium and then flow the cooling medium to the internal cooling medium passage.

6 Claims, 9 Drawing Sheets

(51) Int. Cl.
*H02K 1/32* (2006.01)
*H02K 9/193* (2006.01)
*H02K 11/225* (2016.01)
*H02K 11/21* (2016.01)

(58) Field of Classification Search
USPC ......... 310/61, 52, 54, 57, 227, 53, 58, 60 A, 310/60 R, 62, 63, 59
See application file for complete search history.

(56) References Cited

U.S. PATENT DOCUMENTS

| | | | | |
|---|---|---|---|---|
| 2007/0182283 A1* | 8/2007 | Itomi | ..................... | G01D 11/16 310/323.21 |
| 2008/0024020 A1* | 1/2008 | lund | ........................ | H02K 5/20 310/61 |
| 2010/0219702 A1* | 9/2010 | Jajtic | ..................... | H02K 41/02 310/12.29 |
| 2011/0012448 A1 | 1/2011 | Tanaka | | |
| 2012/0104884 A1* | 5/2012 | Wagner | ..................... | H02K 1/32 310/54 |
| 2013/0342045 A1* | 12/2013 | Matsuki | .................. | H02K 9/19 310/54 |
| 2014/0023484 A1* | 1/2014 | Watanabe | ................ | H02K 5/20 415/116 |
| 2014/0097712 A1* | 4/2014 | Kozaka | ................... | H02K 1/32 310/52 |

FOREIGN PATENT DOCUMENTS

| | | | |
|---|---|---|---|
| JP | 2009-213231 A | 9/2009 | |
| JP | 2011-122711 A | 6/2011 | |
| JP | 2011-254572 A | 12/2011 | |
| JP | WO 2011158685 A1 * | 12/2011 | ............... H02K 1/32 |
| JP | 2012-005290 A | 1/2012 | |

* cited by examiner

COOLING SYSTEM FOR ELECTRIC MOTOR WITH INTERNAL SHAFT PASSAGE AND COOLING MEDIUM RESERVOIR

FIELD

The present invention relates to a motor that a cooling medium is supplied to the inside of the motor for cooling.

BACKGROUND

A motor is used for various purposes. The motor generates heat caused by the Joule heating of a coil included in a stator and the eddy current loss, hysteresis loss, and other losses of a rotor core. A technique is described in which in order to cool a motor, a cooling medium such as oil is used to cool the motor, for example, (Patent Literature 1).

CITATION LIST

Patent Literature

Patent Literature 1: Japanese Patent Application Laid-open No. 2007-020337

SUMMARY

Technical Problem

In the technique described in Patent Literature 1, a cooling fluid (a cooling medium) is pressurized and delivered from above and below along the center line of the rotor shaft of an electric motor (a motor) using a gear pump. However, in the case where the supply of the cooling medium from the gear pump becomes unstable, the supply of the cooling medium to the motor becomes unstable, and it is likely to cause insufficient cooling.

It is an object of the present invention to suppress the insufficient cooling in the case where the supply of a cooling medium to a motor becomes unstable.

Solution to Problem

According to the present invention, a motor comprises: a shaft to which a rotor is attached and having an internal cooling medium passage in an inside of the shaft, a cooling medium passing through the internal cooling medium passage; a housing including the shaft disposed therein and configured to rotatably support the shaft; and a cooling medium reservoir provided in the housing and provided on an upstream side of an inlet of the internal cooling medium passage in a flowing direction of the cooling medium, the cooling medium reservoir being configured to store the cooling medium and then flow the cooling medium to the internal cooling medium passage.

In the present invention, it is preferable that a passage including a restriction section is provided between the cooling medium reservoir and the internal cooling medium passage.

In the present invention, it is preferable that the motor, further comprises: a cooling medium inlet provided on the housing and configured to introduce the cooling medium into the cooling medium reservoir; and a cooling medium introduction member that is a member disposed between the cooling medium inlet and the inlet, in which the cooling medium reservoir is provided on a side of the cooling medium inlet, and the passage penetrates from the cooling medium reservoir toward the inlet.

In the present invention, it is preferable that the motor, further comprises a rotation angle detection sensor mounted on an end portion side of the shaft, the end portion at which the inlet is opened, the rotation angle detection sensor being configured to detect a rotation angle of the shaft, wherein the cooling medium introduction member presses the rotation angle detection sensor from the end portion side of the shaft.

In the present invention, it is preferable that the shaft is supported on the housing on both sides in a longitudinal direction through a bearing; and the motor further comprises a bearing cooling medium passage configured to supply the cooling medium stored in the cooling medium reservoir to the bearing on an end portion side of the shaft at which the inlet is opened.

According to the present invention, a motor comprises: a shaft to which a rotor is attached and having an internal cooling medium passage in an inside of the shaft, a cooling medium passing through the internal cooling medium passage; a housing including the shaft disposed therein and configured to rotatably support the shaft; a cooling medium reservoir provided in the housing and provided on an upstream side of an inlet of the internal cooling medium passage in a flowing direction of the cooling medium, the cooling medium reservoir being configured to store the cooling medium and then flow the cooling medium to the internal cooling medium passage; a cooling medium inlet provided on the housing and configured to introduce the cooling medium into the cooling medium reservoir; and a cooling medium introduction member that is a member disposed between the cooling medium inlet and the inlet, in which the cooling medium reservoir is provided on a side of the cooling medium inlet, and a passage including a restriction section penetrates from the cooling medium reservoir toward the inlet.

The present invention can suppress the insufficient cooling in the case where the supply of a cooling medium to a motor becomes unstable.

DESCRIPTION OF EMBODIMENT

A mode (an embodiment) for carrying out the present invention will be described in detail with reference to the drawings.

<Hybrid Hydraulic Excavator>

Figure 1:
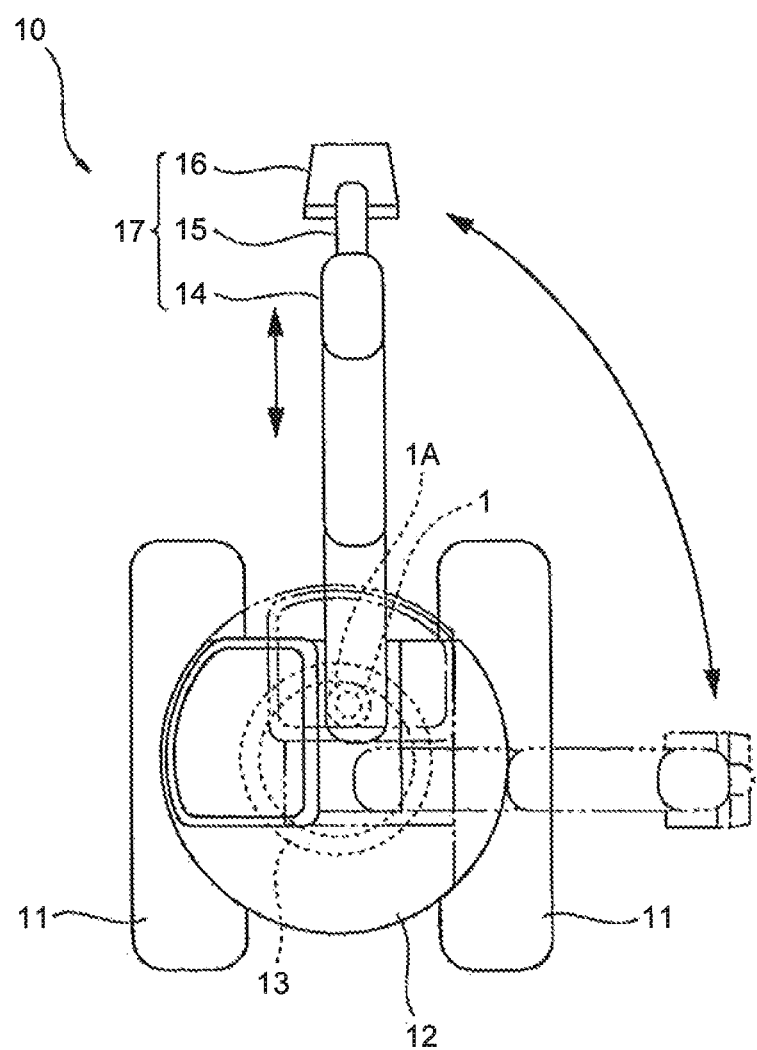
FIG. 1 is a plan view of a hybrid hydraulic excavator in which a motor according to an embodiment is used for a swing motor.

FIG. 1 is a plan view of a hybrid hydraulic excavator in which a motor according to an embodiment is used for a swing motor. A hybrid hydraulic excavator 10 includes a pair of right and left crawler belts 11 forming a lower traveling body, an upper swinging body 12, a swing circle 13 that joins the lower traveling body to the upper swinging body 12, a motor 1 that functions as a swing motor, a swing pinion 1A, and a working machine 17 including a boom 14, an arm 15, and a bucket 16 and mounted on the upper swinging body 12.

The pair of the right and left crawler belts 11 is driven by a right-hand traveling hydraulic motor and a left-hand traveling hydraulic motor, and drives the hybrid hydraulic excavator 10. The upper swinging body 12 is swung by the motor 1 functioning as a swing motor. The outer race of the swing circle 13 is fixed to the upper swinging body 12, and the inner race of the swing circle 13 is fixed to the lower traveling body. With this structure, the swing circle 13 joins the upper swinging body 12 to the lower traveling body. The motor 1 is disposed in a vertical position, that is, the motor 1 is disposed in such a way that an input-and-output shaft of the motor 1 is directed to the gravitational direction in the case where the hybrid hydraulic excavator 10 is disposed on a horizontal plane. The input-and-output shaft of the motor 1 is joined to the swing pinion 1A through a swing machinery including a speed reduction mechanism. The swing pinion 1A is engaged with internal teeth mounted on the inner race of the swing circle 13. The driving force of the motor 1 is transmitted to the swing pinion 1A through the swing machinery to swing the upper swinging body 12. The boom 14, the arm 15, and the bucket 16 are driven by hydraulic cylinders for the boom 14, the arm 15, and the bucket 16 through control valves using a hydraulic fluid pressurized and delivered from a hydraulic pump, not illustrated, and perform jobs such as digging.

The hybrid hydraulic excavator 10 drives a generator and the hydraulic pump using an internal combustion engine, and drives the motor 1 with the electric power of the generator through an inverter, not illustrated, to swing the upper swinging body 12. Moreover, the hybrid hydraulic excavator 10 uses the motor 1 as a generator to generate braking force necessary to stop the upper swinging body 12, and stores the electric power generated by the motor 1 on a storage battery such as a capacitor or a rechargeable battery. As described above, the hybrid hydraulic excavator 10 is a so-called hybrid construction vehicle. In the embodiment, an example will be described in the case where the motor 1 is used as the swing motor of the hybrid hydraulic excavator 10, which is one kind of construction vehicles. However, the applications of the motor 1 are not limited thereto. It is noted that the hybrid hydraulic excavator 10 may be driven according to a system including no internal combustion engine, that is, a system driven by the electric power of a storage battery. Next, the structure of the motor 1 will be described.

<The Structure of the Motor>

Figure 2:
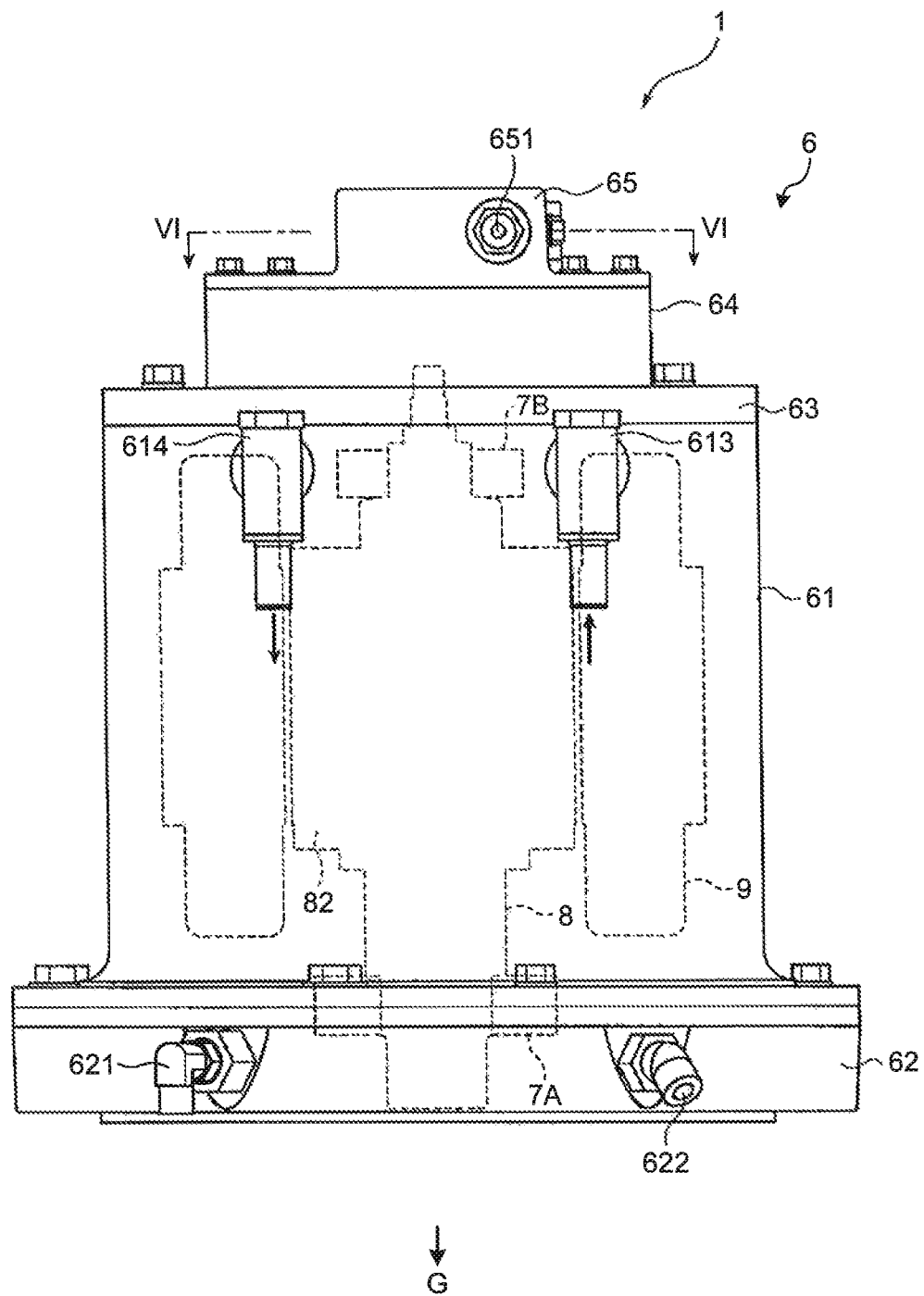
FIG. 2 is a front view of the motor according to the embodiment.
Figure 3:
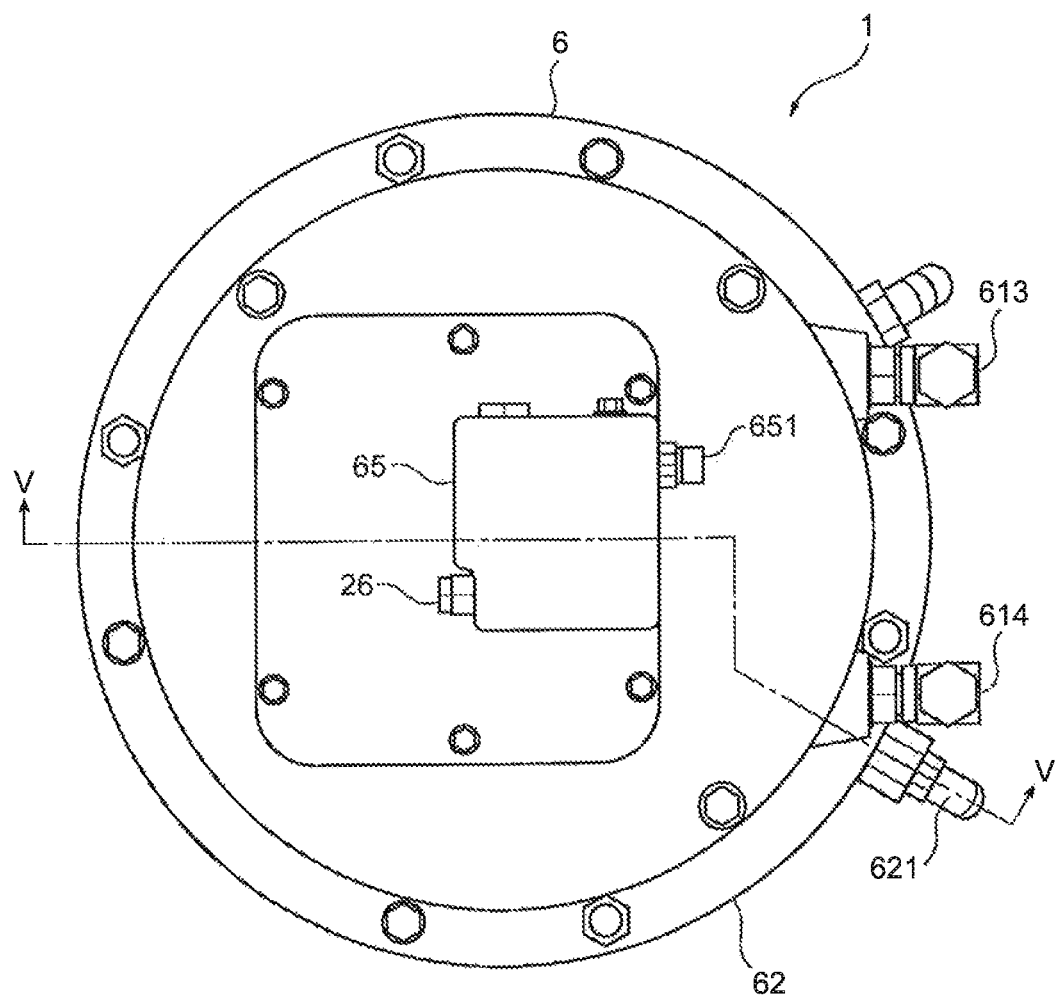
FIG. 3 is a plan view of the motor according to the embodiment.
Figure 4:
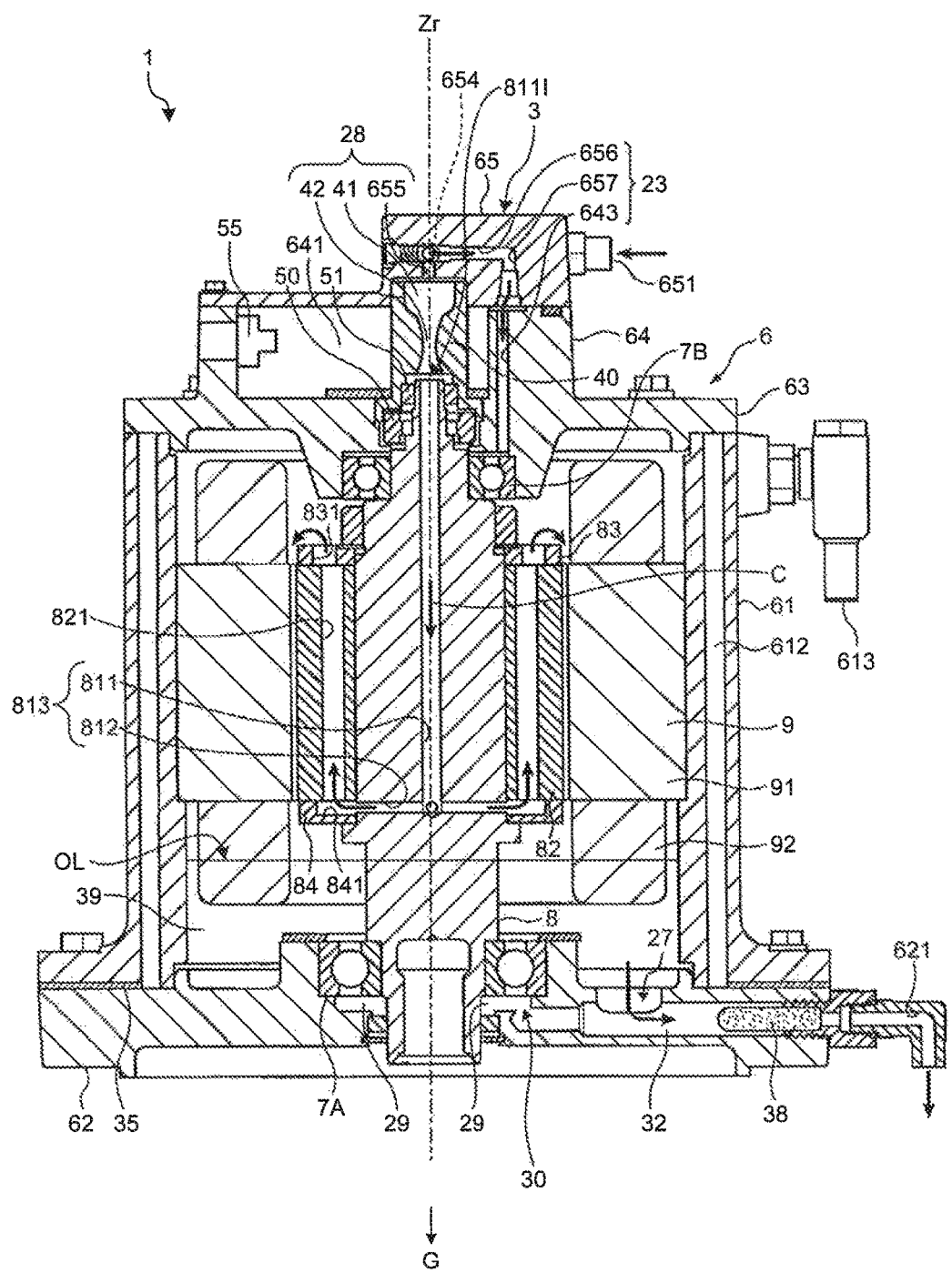
FIG. 4 is a diagram taken along line V-V in FIG. 3.
Figure 5:
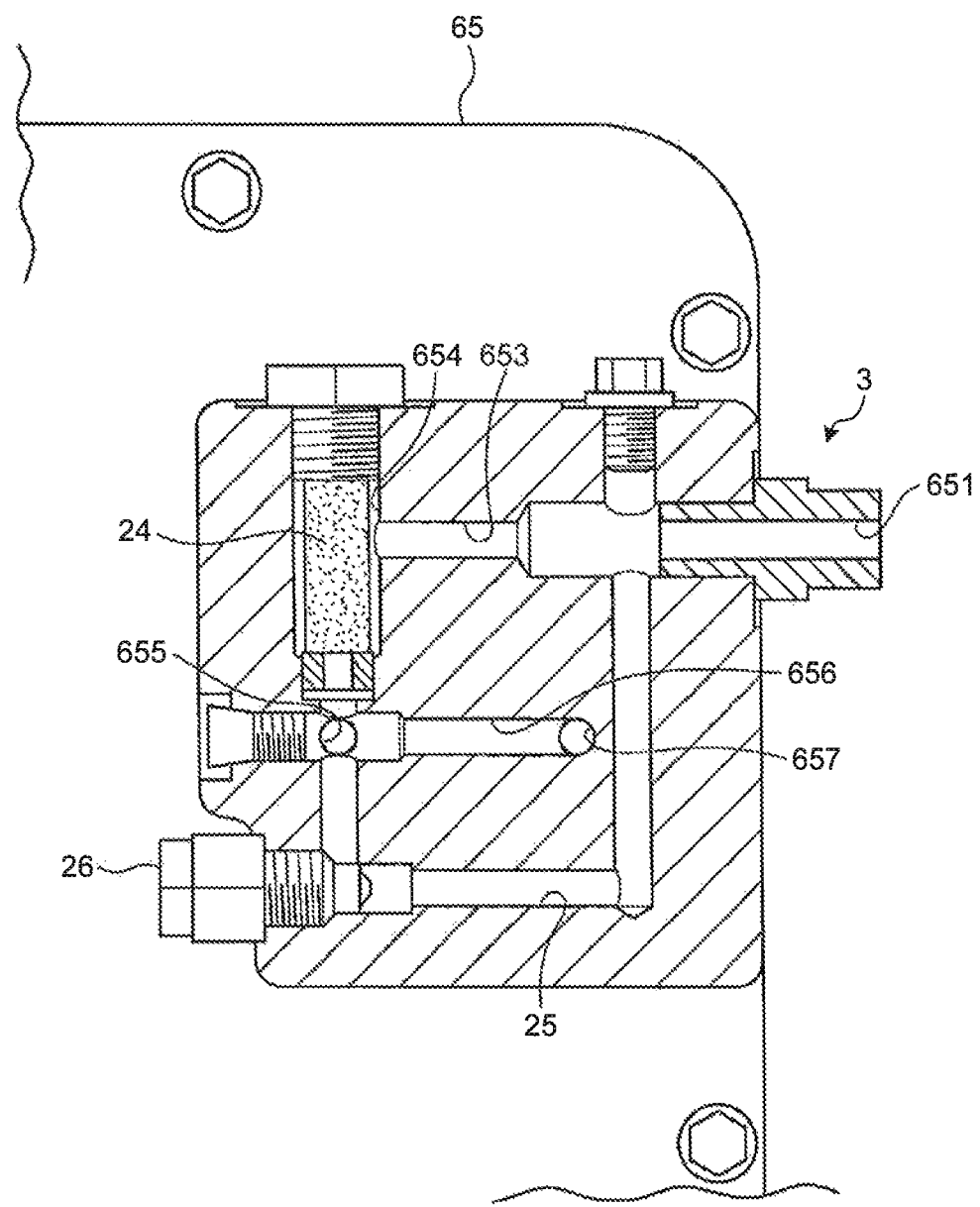
FIG. 5 is a diagram taken along line VI-VI in FIG. 2.

FIG. 2 is a front view of the motor according to the embodiment. FIG. 3 is a plan view of the motor according to the embodiment. FIG. 4 is a diagram taken along line V-V in FIG. 3. FIG. 5 is a diagram taken along line VI-VI in FIG. 2. As illustrated in FIG. 2, the motor 1 includes a shaft 8 as an input-and-output shaft, a rotor core 82 mounted on the shaft 8, and a stator 9 disposed on the outer circumferential portion of the rotor core 82, in the inside of a housing 6 in a tubular shape. Namely, the motor 1 is in a structure in which the shaft 8 is disposed on the inside of the housing 6 in a tubular shape, and the rotor core 82 is mounted on the shaft 8. Bearings 7A and 7B are mounted on both sides of the shaft 8, and the shaft 8 is rotatably supported on the housing 6 through the bearings 7A and 7B.

The housing 6 includes a housing shell 61 that is a tubular member, a first flange 62 that is an end side member mounted on one end portion of the housing shell 61 (on the end portion on the input-and-output side of the shaft 8), and a second flange 63 in a disk shape mounted on the other end portion of the housing shell 61. As described later, the second flange 63 includes a flange projection 64 and a cover 65, and the flange projection 64 and the cover 65 are a part of the housing 6 as well.

The space surrounded by the housing shell 61, the first flange 62, and the second flange 63 is the inside of the housing 6. Moreover, the space surrounded by the second flange 63 and the cover 65 is also the inside of the housing 6. Namely, the space surrounded by at least two of the housing shell 61, the first flange 62, the second flange 63, and the cover 65 included in the inside of the housing 6 is the inside of the housing 6. The first flange 62 is disposed on the lower part (on the gravitational direction side and on the direction side indicated by arrow G in FIGS. 2 and 5) in the state in which the motor 1 is used. For example, in the case where the motor 1 is mounted on the hybrid hydraulic excavator 10 illustrated in FIG. 1, it is supposed that the state in which the hybrid hydraulic excavator 10 contacts a horizontal plane is the state in which the motor 1 is used, and the first flange 62 is disposed at a position on the lower part in the use state.

The housing shell 61 is a member having the inner circumferential surface in a cylindrical shape. The housing shell 61 includes a cooling water inlet port 613 that introduces water to cool the motor 1 into a water jacket 612 illustrated in FIG. 4 and a cooling water outlet port 614 that discharges the cooling water out of the water jacket. It is noted that such a configuration may be possible in which a liquid other than water, oil, for example, is introduced into the water jacket 612 for cooling the motor 1.

In the motor 1, the rotor core 82 and the stator 9, for example, are cooled using a cooling medium such as oil, for example. The cooling medium also serves as a lubricant for the sliding portion of the motor 1. The first flange 62 is a member in a disk shape. The first flange 62 includes a cooling medium outlet port 621 that discharges the cooling medium out of the inside of the housing 6 and guides the cooling medium to a pump that sucks and discharges the cooling medium during the operation of the motor 1. Moreover, the first flange 62 includes a drain port 622 that drains the cooling medium in the inside of the housing 6 in the maintenance and checking of the motor 1. The first flange 62 is disposed on one end portion of the housing 6, and the shaft 8 penetrates through the first flange 62. The shaft 8 penetrating through the first flange 62 is mounted with a joint for power transmission or with the input shaft of a speed reducer, for example. In the embodiment, the first flange 62 is a member separate from the housing shell 61. However, the first flange 62 and the housing shell 61 may be formed as a single member.

The second flange 63 is disposed on the upper part, that is, disposed on the opposite side of the gravitational direction in the state in which the motor 1 is used. The second flange 63 includes the flange projection 64 and the cover 65. The cover 65 includes a cooling medium inlet 651. The cooling medium inlet 651 introduces the cooling medium discharged from the pump into the inside of the housing 6. Next, the internal structure the motor 1 of will be described.

<The Internal Structure of the Motor>

As illustrated in FIG. 4, the bearing 7A mounted on the one end portion side of the shaft 8 is mounted on the first flange 62, and the bearing 7B mounted on the other end portion side of the shaft 8 is mounted on the second flange 63. With this structure, the shaft 8 is rotatably supported on the housing 6 (more specifically, on the housing shell 61, the first flange 62, and the second flange 63) by two bearings 7A and 7B provided on both sides of the shaft 8, and rotates about a rotational center axis Zr. The rotational center axis Zr is the center axis of the shaft 8.

The rotor core 82 mounted on the outer circumferential portion of the shaft 8 is a structure body having a plurality of steel sheets (magnetic steel sheets) stacked on each other. The rotor core 82 is clamped with balance plates 83 and 84 from both sides of the direction in which the steel sheets are stacked (in the stacking direction). The balance plates 83 and 84 are mounted on the shaft 8 so as not to separate a plurality of steel sheets configuring the rotor core 82, and apply compressive force to the plurality of steel sheets. The balance plate 84 on the first flange 62 side is disposed on the first flange 62 side, that is, on the input-and-output side of the shaft 8 of the motor 1.

The outer circumferential portion of the rotor core 82 is disposed with the stator 9 mounted on the inner circumferential portion of the housing shell 61 of the housing 6. The stator 9 is a structure body in which a coil 92 is wound around a stator core 91. A portion protruding from the stator core 91 of the coil 92 is a coil end. The stator core 91 is a structure body having a plurality of steel sheets (magnetic steel sheets) stacked on each other.

The shaft 8 includes an axial passage 811 extending along the rotational center axis Zr and a plurality of radial passages 812 extending from the axial passage 811 toward the outer side of the shaft 8 in the radial direction and opened on the surface of the shaft 8. The axial passage 811 and the radial passages 812 form an intra-shaft cooling medium passage 813 as an internal cooling medium passage. The axial passage 811 includes an inlet 811I opened at the end portion of the shaft 8 on the bearing 7B side. The inlet 811I is an opening that introduces the cooling medium into the axial passage 811. The cooling medium flowing from the inlet 811I into the axial passage 811 flows into the axial passage 811 in the direction indicated by arrow C. Also in the following, arrow C indicates the direction in which the cooling medium flows.

The balance plate 84 includes a recess 841 on the side on which the balance plate 84 contacts the rotor core 82. The rotor core 82 includes a rotor core through hole 821 penetrating through the rotor core 82 in the stacking direction of a plurality of steel sheets, that is, in the direction in parallel with the rotational center axis Zr of the shaft 8. Moreover, the rotor core 82 includes a plurality of permanent magnets, not illustrated. The balance plate 83 on the second flange 63 side includes a balance plate through hole 831 in the direction in parallel with the rotational center axis Zr of the shaft 8. The intra-shaft cooling medium passage 813, the recess 841, the rotor core through hole 821, and the balance plate through hole 831 communicate with each other, and form passages through which the cooling medium passes. The passages are provided on the shaft 8 and the rotor core 82, which are rotators, and form rotator side cooling medium passages through which the cooling medium passes.

On one end portion side of the shaft 8, more specifically, on the side circumferential portion on the end portion side on the second flange 63 side, a resolver 50 is mounted as a rotation angle detection sensor that detects the rotation angle of the shaft 8. The axial passage 811 is opened on the end portion on the second flange 63 side. Namely, the resolver 50 is mounted on the side circumferential portion of the shaft 8 on the end portion side where the axial passage 811 is opened.

The flange projection 64 of the second flange 63 includes an intra-projection space 641. The intra-projection space 641 is provided with a cooling medium introduction member 40 as a presser member. The cooling medium introduction member 40 has a function of supplying the cooling medium from a cooling medium supply unit 3 included in the cover 65, which is a rest system, to the shaft 8, which is a rotating system, and a function of pressing and fixing the resolver 50 as a rotation angle detection sensor to the flange projection 64 provided on the second flange 63. The cooling medium introduction member 40 includes a cooling medium introduction passage 42 penetrating through the inside of the cooling medium introduction member 40. The cooling medium introduction passage 42 faces the opening of the axial passage 811 of the shaft 8, that is, the cooling medium introduction passage 42 faces the inlet 811I, and introduces the cooling medium into the axial passage 811. Moreover, the flange projection 64 includes a bearing side passage 643 that supplies the cooling medium to the bearing 7B. The bearing 7B is supplied with the cooling medium from the bearing side passage 643. Furthermore, the flange projection 64 is mounted with a connector 55 that holds a cable to lead out the output of the resolver 50.

The cover 65 is mounted on the opening of the flange projection 64, and blocks the intra-projection space 641 included in the flange projection 64. In addition, the cover 65 includes the cooling medium supply unit 3. More specifically, the cooling medium supply unit 3 is provided on the inside of the cover 65 configuring the housing 6. Since the cover 65 is disposed on the upper part (on the opposite side of the vertical direction), the cooling medium supply unit 3 is also disposed on the upper part. The cooling medium supply unit 3 includes a bearing passage 23 and a rotor passage 28, described later. The cooling medium supply unit 3 introduces the cooling medium from the cooling medium inlet 651 mounted on the cover 65, which is a rest system, and supplies the cooling medium to the intra-shaft cooling medium passage 813 included in the shaft 8, which is a rotating system, through the rotor passage 28. As described above, the cooling medium supply unit 3 supplies the cooling medium from the rest system to the rotating system. Moreover, the cooling medium supply unit 3 also supplies the cooling medium introduced from the cooling medium inlet 651 to the bearing side passage 643 included in the flange projection 64 through the bearing passage 23. The cooling medium supplied to the bearing side passage 643 is supplied to the bearing 7B.

As illustrated in FIG. 5, the cover 65 mounted on the flange projection 64 includes a first cooling medium distribution passage 653, a second cooling medium distribution passage 655, a third cooling medium distribution passage 656, and a fourth cooling medium distribution passage 657 that distribute the cooling medium from the cooling medium inlet 651. Moreover, the cover 65 includes a filter storage portion 654 that stores a filter 24, a relief passage 25, and a relief valve 26. The cooling medium inlet 651 is connected to the filter storage portion 654 through the first cooling medium distribution passage 653.

The second cooling medium distribution passage 655 is connected to the filter storage portion 654, and introduces a part of the cooling medium passing through the filter 24 into a cooling medium reservoir 41 of the cooling medium introduction member 40. The cooling medium introduction passage 42 is connected to the cooling medium reservoir 41. The cooling medium introduction passage 42 introduces the cooling medium in the cooling medium reservoir 41 into the axial passage 811 included in the shaft 8. The cooling medium introduction passage 42 is a passage having a restriction section disposed between the cooling medium reservoir 41 and the axial passage 811, which is a part of the internal cooling medium passage.

The motor 1 is disposed or mounted on a mounting object in such a way that the rotational center axis Zr is in parallel with the gravitational direction (the direction indicated by arrow G in FIG. 4). In the embodiment, the cooling medium reservoir 41 is positioned on the upper part when the motor 1 is disposed or mounted. With this configuration, the cooling medium supplied from the cooling medium supply unit 3 included in the cover 65 to the cooling medium reservoir 41 flows down due to the action of gravity, and flows from the cooling medium introduction passage 42 into the axial passage 811.

The second cooling medium distribution passage 655, the cooling medium reservoir 41, and the cooling medium introduction passage 42 correspond to the rotor passage 28. The third cooling medium distribution passage 656 is connected to the filter storage portion 654, and introduces the rest of the cooling medium, which passes through the filter 24 and is introduced into the cooling medium introduction passage 42, into the fourth cooling medium distribution passage 657. The third cooling medium distribution passage 656, the fourth cooling medium distribution passage 657, and the bearing side passage 643 correspond to the bearing passage 23.

The relief passage 25 connects the cooling medium inlet 651 to the relief valve 26. The relief valve 26 is disposed between the relief passage 25, the second cooling medium distribution passage 655, and the third cooling medium distribution passage 656 so as to bypass the filter 24. When the pressure of the cooling medium in the relief passage 25 exceeds the valve opening pressure of the relief valve 26, the relief valve 26 is opened, and the cooling medium from the cooling medium inlet 651 flows into the second cooling medium distribution passage 655 and the third cooling medium distribution passage 656 as the cooling medium bypasses the filter 24. The valve opening pressure of the relief valve 26 can be set to the pressure in the relief passage 25 at which the filter 24 is clogged and replacement is needed, for example. With this configuration, even though the filter 24 is clogged and replacement is needed, the cooling medium can be reliably supplied to the bearing 7B and the rotor core 82, for example. Moreover, the valve opening pressure of the relief valve 26 is thus set, and a unit to notify that the relief valve 26 is opened is prepared, so that the replacement time of the filter 24 can be notified because the relief valve 26 is opened.

In the embodiment, in a plurality of the cooling medium passages included in the cover 65, the passages orthogonal to the rotational center axis Zr of the motor 1 are disposed on the same flat plane. In this case, the center axes of the passages are disposed on the same flat plane. More specifically, the center axes of the first cooling medium distribution passage 653, the filter storage portion 654, the third cooling medium distribution passage 656, the relief passage 25, the passage connecting the relief valve 26 to the relief passage, the passage connecting the filter storage portion 654 to the first cooling medium distribution passage 653 and the cooling medium inlet 651, and so on illustrated in FIG. 5 are disposed on the same flat plane.

The passages in the cover 65 orthogonal to the rotational center axis Zr of the motor 1 are bored through the cover 65 in the horizontal direction, for example. The disposition of the passages as described above facilitates the selection of efficient steps and allows efficient processing in processing the passages on the cover 65. Namely, in the case where a plurality of the passages orthogonal to the rotational center axis Zr of the motor 1 is formed in the cover 65, the height from the reference plane to tools is made constant, and the passages can be bored at a plurality of locations on the cover 65 in the horizontal direction, so that the occasions in which the height of the tools is changed can be made at the minimum. As a result, it is possible to reduce working periods and time and effort to set tools in forming a plurality of the passages orthogonal to the rotational center axis Zr of the motor 1 on the cover 65, so that productivity can be improved, and manufacturing costs can be reduced.

The flange projection 64, that is, the bearing passage 23 is provided on the rest system, and the supply of the cooling medium is not affected by the rotation of the rotor core 82. Thus, as compared with the case where oil passages are formed on the bearing 7B from the shaft 8 side, variations in the cooling medium in association with the rotation of the rotor core 82 can be suppressed. As a result, an appropriate amount of the cooling medium can be supplied to the bearing 7B. Next, the cooling system of the motor 1 will be described.

<The Cooling System of the Motor>

Figure 6:
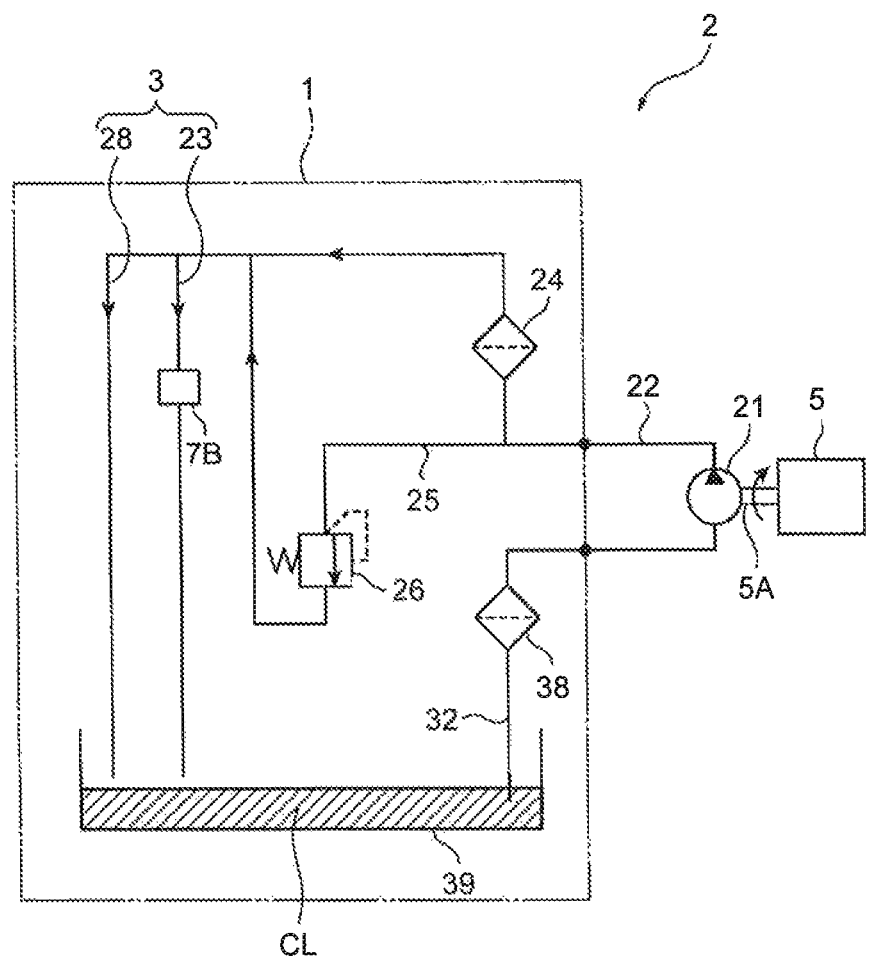
FIG. 6 is a schematic diagram of a cooling system of the motor according to the embodiment.

FIG. 6 is a schematic diagram of the cooling system of the motor according to the embodiment. As described above, in the motor 1, a cooling medium CL cools the rotor core 82 and the stator 9, for example, and the cooling medium CL lubricates the bearings 7A and 7B. A cooling system 2 (in the following, appropriately referred to as a cooling system) of the motor 1 includes a pump 21, a pump motor 5, a passage 22, the bearing passage 23, the rotor passage 28, an oil reservoir portion 39, a discharge passage 32, the filter 24, the relief passage 25, the relief valve 26, and a filter 38. A cooler that cools the cooling medium CL may be disposed between the filter 38 and the pump 21. The pump 21 is joined to the pump motor 5 using an output shaft 5A of the pump motor 5. The drive unit for the pump 21 may be a drive unit other than the pump motor 5. For example, the drive unit may be an internal combustion engine, which is the power source of the hybrid hydraulic excavator 10 illustrated in FIG. 1. In the embodiment, the filter 24 and the filter 38 are incorporated in the motor 1.

In the case of cooling the motor 1, the pump motor 5 drives the pump 21. The pump 21 then sucks the cooling medium CL from the discharge passage 32, and discharges the cooling medium CL to the passage 22. Foreign substances, for example, are removed from the cooling medium CL in the process in which the cooling medium CL passes through the filter 24, and the cooling medium CL flows into the bearing passage 23 and the rotor passage 28. The cooling medium CL flowing into the bearing passage 23 cools and lubricates the bearing 7B, and then the cooling medium CL is collected into the oil reservoir portion 39. The cooling medium CL flowing into the rotor passage 28 cools the rotor core and the coil of the motor 1, and then the cooling medium CL is collected into the oil reservoir portion 39. The oil reservoir portion 39 is connected to the suction port of the pump 21 with the discharge passage 32 in the midway point of which the filter 38 is provided. The cooling medium CL collected into the oil reservoir portion 39 passes through the discharge passage 32, and foreign substances are removed from the cooling medium CL through the filter 38. The cooling medium CL is again sucked into the pump 21, and discharged to the passage 22.

The passage 22 is connected to the discharge port of the pump 21, and branched to the inlet side of the filter 24 and the relief passage 25 in the motor 1. The passage provided on the outlet side of the filter 24 to pass the cooling medium is branched to the bearing passage 23 and the rotor passage 28. The bearing passage 23 supplies the cooling medium to the bearing 7B for cooling and lubricating the bearing 7B. The rotor passage 28 supplies the cooling medium to the rotor of the motor 1 for cooling and lubricating the rotor. It is noted that the cooling system 2 does not necessarily include the bearing passage 23. The relief passage 25 branched from the passage 22 connected to the discharge port of the pump 21 is connected to the inlet of the relief valve 26. The outlet side of the relief valve 26 is connected to the outlet side of the filter 24. Next, the flow of the cooling medium in cooling the motor 1 will be described.

<A Flow of the Cooling Medium in Cooling>

A part of the cooling medium that is supplied from the cooling medium inlet 651 of the cover 65 and passes through the filter 24 flows into the cooling medium reservoir 41 of the rotor passage 28. The cooling medium is stored in the cooling medium reservoir 41, and then flows into the axial passage 811 of the intra-shaft cooling medium passage 813 through the cooling medium introduction passage 42. The cooling medium passes through the radial passages 812, and then flows into the rotor core through hole 821 through the recess 841 of the balance plate 84. The cooling medium cools the rotor core 82 and the permanent magnets, not illustrated, in the process in which the cooling medium passes through the rotor core through hole 821, and then flows out of the balance plate through hole 831 of the balance plate 83. In the case where the rotor core 82 is rotating, the cooling medium flowing out of the balance plate through hole 831 is supplied to the coil end of the stator 9 (to the portion at which the coil 92 protrudes from the stator core 91) due to centrifugal force. The cooling medium cools the stator 9 in the process in which the cooling medium flows down in the inside of the housing 6, and the cooling medium is collected to a first outlet port 27 provided on the inner side of the first flange 62 of the housing 6. The reference sign OL in FIG. 4 indicates the liquid level of the cooling medium stored in the oil reservoir portion 39. As described above, for the amount of the cooling medium stored in the oil reservoir portion 39, the discharge amount from the cooling medium outlet port 621 is adjusted in such a way that a part of the coil end protruding toward the first flange side always remains in the cooling medium as illustrated in FIG. 4, and the cooling medium cools the coil end.

In the cooling medium that is supplied from the cooling medium inlet 651 of the cover 65 and passes through the filter 24, the cooling medium that does not flow into the rotor passage 28 flows into the bearing passage 23, and is supplied to the bearing 7B. The cooling medium cools and lubricates the bearing 7B, and flows down in the inside of the housing 6. In the process in which the cooling medium flows down in the inside of the housing 6, the cooling medium that contacts the rotor core 82 is supplied to the stator 9 on the outer side of the rotor core 82 in the radial direction due to centrifugal force, and the cooling medium cools the stator 9. The cooling medium that cools the stator 9 flows down in the inside of the housing 6, and the cooling medium is collected into the oil reservoir portion 39 provided on the inner side of the first flange 62 of the housing 6.

The cooling medium collected into the oil reservoir portion 39 mainly flows into the discharge passage 32 through the first outlet port 27. The cooling medium is guided to the filter 38 for removal of foreign substances, for example, and is discharged from the cooling medium outlet port 621 included in the first flange 62. The cooling medium in the oil reservoir portion 39 that does not pass through the first outlet port 27 flows into a bearing outer space 29 through the space between the inner ring, outer ring, and rolling element of the bearing 7A, and then passes through a second outlet port 30. As a result, a part of the cooling medium collected into the oil reservoir portion 39 cools and lubricates the bearing 7A. The cooling medium passing through the second outlet port 30 flows into the discharge passage 32, and the cooling medium is guided to the filter 38 for the removal of foreign substances, for example, and discharged from the cooling medium outlet port 621 included in the first flange 62.

As described above, the cooling medium cools the rotor core 82 and the stator 9 as well as cools and lubricates the bearings 7A and 7B. In addition to this, as described above, cooling water is supplied from the cooling water inlet port 613 to the water jacket 612 included in the housing shell 61 of the housing 6. This cooling water mainly cools the stator 9 through the housing 6. A gasket 35 is disposed between the first flange 62 and the housing shell 61 as a sealing member that seals the water jacket 612. The gasket 35 also has the function as an oil seal that avoids an event that the cooling medium in the inside of the housing 6 flows out between the housing shell 61 and the first flange 62 and is included in the water jacket 612 or that the cooling medium flows out of the housing 6. Next, the cooling medium reservoir 41 and the cooling medium introduction passage 42 as a passage will be described in more detail.

<The Cooling Medium Reservoir and the Cooling Medium Introduction Passage>

Figure 7:
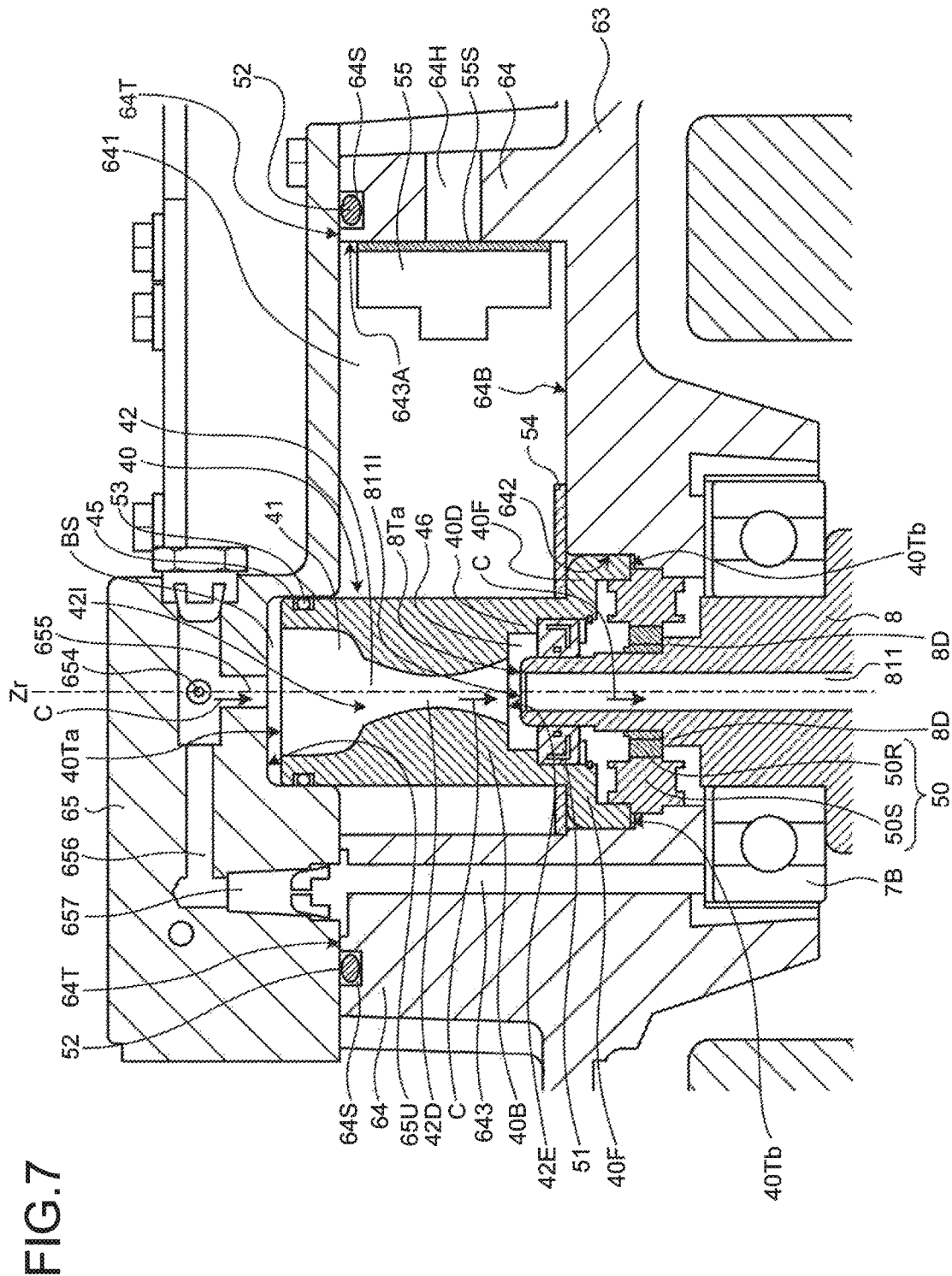
FIG. 7 is an enlarged cross sectional view of a cooling medium reservoir and a cooling medium passage included in the motor according to the embodiment.

FIG. 7 is an enlarged cross sectional view of the cooling medium reservoir and the cooling medium passage included in the motor according to the embodiment. The motor 1 includes the cooling medium introduction member 40 disposed between the cover 65 and the second flange 63. The cooling medium introduction member 40 is a member disposed between the cooling medium inlet 651 and the inlet 811I of the axial passage 811 illustrated in FIG. 4. In the embodiment, the cooling medium introduction member 40 is disposed on the space surrounded by the second flange 63 and the cover 65, that is, disposed on the inside of the housing 6.

The cooling medium introduction member 40 is provided with the cooling medium reservoir 41 on the cooling medium inlet 651 side, on the second cooling medium distribution passage 655 side connected to the cooling medium inlet 651 in this example, and the cooling medium introduction passage 42 penetrates from the cooling medium reservoir 41 toward the inlet 811I. The direction in which the cooling medium introduction passage 42 penetrates through the cooling medium introduction member 40 is the direction in parallel with the rotational center axis Zr of the shaft 8. The cooling medium reservoir 41 is disposed on the inside of the housing 6 together with the cooling medium introduction member 40.

The cooling medium introduction member 40 is a member in a nearly cylindrical shape. In the embodiment, the cooling medium introduction member 40 also serves as a resolver presser that presses the resolver 50. This point will be described later. The cooling medium reservoir 41 is a cone-shaped recess provided on one end portion of the cooling medium introduction member 40, that is, provided on the end portion opposite to the opening of the second cooling medium distribution passage 655 provided on the cover 65. The cooling medium reservoir 41 is opposite to the second cooling medium distribution passage 655. The cooling medium flowing into the cooling medium inlet 651 and flowing out of the second cooling medium distribution passage 655 is temporarily stored in the cooling medium reservoir 41.

The cooling medium reservoir 41 includes an opening 42I of the cooling medium introduction passage 42 on the bottom, that is, on the other end portion side of the cooling medium introduction member 40. The cooling medium introduction passage 42 penetrates through the cooling medium introduction member 40 from the bottom of the cooling medium reservoir 41 toward the other end portion. An opening 42E of the cooling medium introduction passage 42 opened on the other end portion of the cooling medium introduction member 40 is opposite to the inlet 811I of the axial passage 811. The cooling medium temporarily stored in the cooling medium reservoir 41 flows from the opening 42I into the cooling medium introduction passage 42, flows out of the opening 42E, and flows from the inlet 811I of the axial passage 811 into the axial passage 811. As described above, the cooling medium reservoir 41 is provided on the inside of the housing 6, and on the upstream side of the inlet 811I of the axial passage 811 in the flowing direction of the cooling medium (in the direction indicated by arrow C), and the cooling medium reservoir 41 stores the cooling medium, and then flows the cooling medium to the axial passage 811.

since an O-ring 53 is disposed between a recess 65U of the cover 65 and the cooling medium introduction member 40, the leakage of the cooling medium between the recess 65U of the cover 65 and the cooling medium introduction member 40 is suppressed. Moreover, since an oil seal 51 is disposed between the cooling medium introduction member 40 and the shaft 8, the leakage of the cooling medium between the cooling medium introduction member 40 and the shaft 8 is suppressed. With this structure, the cooling medium supplied from the second cooling medium distribution passage 655 is supplied to the axial passage 811 of the shaft 8 through the cooling medium reservoir 41 of the cooling medium introduction member 40 and the cooling medium introduction passage 42. The cooling medium introduction member 40 is provided on the rest system, and the shaft 8 is provided on the rotating system, so that the cooling medium is supplied from the rest system to the rotating system.

The cooling medium introduction passage 42 includes a restriction section 42D between the cooling medium reservoir 41 and the axial passage 811. The restriction section 42D is a portion at which the cross sectional area of the cooling medium introduction passage 42 is the smallest between the opening 42I and the opening 42E. The cross sectional area described above is the area of the cross section orthogonal to the direction in which the cooling medium introduction passage 42 penetrates through the cooling medium introduction member 40, and is appropriately referred to as a passage cross sectional area. The restriction section 42D adjusts the flow rate of the cooling medium stored in the cooling medium reservoir 41 to flow out of the opening 42E of the cooling medium introduction passage 42. The restriction section 42D is provided between the cooling medium reservoir 41 and the axial passage 811, and the cooling medium reservoir 41 can always hold an appropriate amount of the cooling medium during the operation of the motor 1, so that the motor 1 can stably supply the cooling medium to the axial passage 811. Moreover, the restriction section 42D can flow the cooling medium from the cooling medium reservoir 41 into the axial passage 811 at an appropriate flow rate.

In the embodiment, the passage cross sectional area of the cooling medium introduction passage 42 is gradually reduced from the opening 42I on the cooling medium reservoir 41 side, the passage cross sectional area becomes at the minimum at the restriction section 42D, and then the passage cross sectional area is gradually increased toward the opening 42E of the inlet 811I of the axial passage 811 side. As described above, the diameter of the cooling medium introduction passage 42 is gradually reduced from the opening 42I toward the restriction section 42D, and the diameter is gradually increased from the restriction section 42D toward the opening 42E, so that there is an advantage that manufacture is facilitated in the case where the cooling medium introduction member 40 is manufactured by casting such as die-casting, for example. The restriction section 42D is not limited to one as in the embodiment. For example, such a configuration may be possible in which such a cooling medium introduction passage 42 is used whose passage cross sectional area is constant between the opening 42I and the opening 42E and an orifice is mounted on a portion in the midway point to form the restriction section 42D. FIG. 7 is an example in which the inner surface of the cooling medium introduction passage 42 is changed in a curve in the cross section in parallel with the extending direction of the cooling medium introduction passage 42. However, the inner surface of the cooling medium introduction passage 42 may be changed linearly.

In the motor 1, the cooling medium is stored in the cooling medium reservoir 41, and introduced into the axial passage 811 for cooling the rotor core and the coil. Thus, the motor 1 can stably supply the cooling medium into the inside of the housing 6 even though the supply of the cooling medium from the pump 21 illustrated in FIG. 6 is unstable. As a result, the motor 1 can suppress the insufficient cooling of the coil 92 of the stator 9 and the magnets, for example, included in the rotor core 82, and can suppress the insufficient lubrication of the bearing 7B and the oil seal 51, so that a reduction in the durability of the components can be suppressed. Moreover, in the motor 1, the cooling medium is stored in the cooling medium reservoir 41 in a certain amount, and then supplied to the inside of the housing 6, so that the motor 1 can stably cool the coil 92, for example, and can stably exert the performance.

Furthermore, the motor 1 introduces the cooling medium stored in the cooling medium reservoir 41 into the axial passage 811, it can be suppressed that air flows from the opening 42I of the cooling medium introduction passage 42 even though the rotational center axis Zr of the motor 1 is tilted in the gravitational direction. As a result, the motor 1 can stably supply the cooling medium into the inside of the housing 6, can suppress the insufficient cooling of the coil 92 of the stator 9 and the magnets included in the rotor core 82, for example, and can suppress the insufficient lubrication of the bearing 7B and the oil seal 51.

In addition, the cooling medium is stored in the cooling medium reservoir 40 near the cover 65 existing on the boundary between the inside of the housing 6 and the outside, so that the effect of cooling the stator 9 and the magnets included in the rotor core 82, for example, is improved. Moreover, at the timing at which the motor 1 needs the cooling medium, a suction pressure is produced in the axial passage 811 due to centrifugal force caused by the rotation of the rotor during the rotation of the rotor, for example. When the suction pressure is produced because the cooling medium is stored in the cooling medium reservoir 40, a larger amount of the cooling medium is supplied from the cooling medium reservoir 41 to the rotor. As described above, the motor 1 can effectively supply the cooling medium to the rotor at the timing at which the cooling medium is needed.

Furthermore, a certain amount of the cooling medium is stored in the cooling medium reservoir 41, so that the amount of the cooling medium stored in the oil reservoir portion 39 in the housing 6 can be reduced during the operation of the motor 1. Thus, the area of the rotor contacting the cooling medium stored in the oil reservoir portion 39 can be reduced, so that the rotational resistance of the rotor can be reduced. As a result, the use efficiency of electric power is improved in the motor 1. Next, the resolver 50 will be described.

<Resolver>

The resolver 50 includes a resolver rotor 50R mounted on the shaft 8, which is a rotating system, and a resolver stator 50S mounted on the second flange 63, which is a rest system. The resolver rotor 50R rotates together with the shaft 8. Therefore, the resolver rotor 50R rotates about the rotational center axis Zr of the shaft 8. The resolver stator 50S of the resolver 50 is fit into a rotation angle detection sensor holding portion 642, which is a recess provided on the second flange 63. The shaft 8 mounted with the resolver rotor 50R includes a step 8D whose outer diameter is greater than the inner diameter of the resolver rotor 50R, and the step 8D retains the resolver rotor 50R.

The resolver 50 is pressed against the second flange 63 from one end portion of the shaft 8 (an end face 8Ta on which the axial passage 811 is opened) side by the cooling medium introduction member 40. The cooling medium introduction member 40 is fixed to the second flange 63 by a fixing member 54 as a plate member. With this configuration, the resolver 50 (more specifically, the resolver stator 50S) is fixed to the second flange 63. For example, the fixing member 54 can be manufactured as by punching and bending a metal plate member.

As illustrated in FIG. 7, the cooling medium introduction member 40 in a nearly cylindrical shape includes a shell 40B in a column shape and a protruding portion 40F provided on one end portion of the shell 40B and protruding toward the outer side of the shell 40B in the radial direction. The shell 40B includes a groove 45 extending in the circumferential direction on the other end portion side, that is, on the end portion side opposite to the end portion where the protruding portion 40F is provided. As illustrated in FIG. 7, the groove 45 is provided with the O-ring 53 as a sealing member. The cooling medium introduction member 40 is manufactured as by casting or die-casting an aluminum alloy, for example. Since the cooling medium introduction member 40 is a member separate from the cover 65, the cooling medium introduction member 40 may be manufactured using a material different from the material of the cover 65. With this configuration, an appropriate material can be used for the cooling medium introduction member 40, and the accuracy of the cooling medium introduction member 40 can also be improved.

The end face on the opposite side of the end face of the cooling medium introduction member 40 on which the cooling medium reservoir 41 is opened, that is, an end face 40Tb of the cooling medium introduction member 40 on the protruding portion 40F side contacts the resolver stator 50S of the resolver 50. Moreover, the end face of the cooling medium introduction member 40 of the cooling medium introduction member 40, that is, an end face 40Ta on the groove 45 side is fit into the recess 65U included in the cover 65, and faces the recess 65U. It is noted that the cover 65 is a portion at which the cooling medium supply unit 3 illustrated in FIG. 4 is provided in the housing 6.

As illustrated in FIG. 7, the cooling medium introduction member 40 includes a recess 46 on the protruding portion 40F side. The recess 46 is in a circular shape when seen on a plane, having the smallest inner diameter on the end face 40Ta side on the groove 45 side, and a larger inner diameter on the end face 40Tb side of the protruding portion 40F. A portion at which the inner diameter of the recess 46 is changed is a step 40D. As illustrated in FIG. 7, a portion at which the shaft 8 protrudes from the resolver rotor 50R of the resolver 50 is inserted into the recess 46. The oil seal 51 as a sealing member is provided between the shaft 8 and the recess 46 of the cooling medium introduction member 40. The step 40D retains the oil seal 51 provided with the recess 46.

The flange projection 64 is a portion protruding from the second flange 63, and includes the intra-projection space 641 in the inside of the flange projection 64. The intra-projection space 641 is closed by mounting the cover 65 on a projection end face 64T. The projection end face 64T is formed with a groove 64S. The groove 64S is mounted with an O-ring 52. With this structure, the O-ring 52 seals the projection end face 64T and the cover 65.

The cooling medium introduction member 40 is disposed in the intra-projection space 641, and disposed between the cover 65 and the second flange 63, more specifically, between the recess 651 of the cover 65 and the rotation angle detection sensor holding portion 642 of the flange projection 64. The cooling medium introduction member 40 is mounted on the rotation angle detection sensor holding portion 642, and the cooling medium introduction member 40 presses and fixes the resolver 50 to the second flange 63. In the pressing, the cooling medium introduction member 40 presses the resolver 50 from the end portion side of the shaft 8 on which the inlet 811I is opened. The end face 40Ta on the groove 45 side then protrudes on the outer side of the intra-projection space 641 beyond the projection end face 64T of the flange projection 64. The protruding cooling medium introduction member 40 is fit into the recess 65U of the cover 65. The depth of the recess 65U is greater than a dimension from the projection end face 64T to the end face 40Ta on the groove 45 side. Thus, a space BS is formed between the end face 40Ta of the cooling medium introduction member 40 on the groove 45 side, which is fit into the recess 65U, and the recess 65U opposite to the end face 40Ta. For example, the space BS avoids the contact between the resolver 50 and the cover 65 in the case where the cooling medium introduction member 40 extends due to a temperature rise.

After the cooling medium introduction member 40 presses the resolver 50, the cooling medium introduction member 40 is mounted on the second flange 63 using the fixing member 54. The resolver 50 is then fixed to the second flange 63 through the fixing member 54 and the cooling medium introduction member 40. When the cover 65 is mounted on the flange projection 64, the end face 40Ta of the cooling medium introduction member 40 is fit into the recess 65U of the cover 65. However, since the space BS is disposed between the recess 65U and the cooling medium introduction member 40, it is avoided that force is applied from the cover 65 to the resolver 50 through the cooling medium introduction member 40.

In the embodiment, the resolver 50 is fixed to and held on the second flange 63 using the cooling medium introduction member 40 and the fixing member 54, without using the cover 65. Namely, the function of pressing and holding the resolver 50 (a resolver holding function) is separated from the cover 65, and the resolver holding function is provided on the cooling medium introduction member 40 and the fixing member 54. The cover 65 is provided with the function of sealing the intra-projection space 641 (a projection space sealing function). In the case where a single member (for example, the cover 65) includes both of the resolver holding function and the projection space sealing function, it is difficult to implement the two functions unless the position accuracy between the member and the resolver 50 and the position accuracy between the member and the projection end face 64T are increased. Namely, it is difficult to implement the two functions unless the accuracy is increased at two positions in a single member. However, in the embodiment, since different members separately have the resolver holding function and the projection space sealing function, it is unnecessary to provide the two functions on a single member. As a result, it is unnecessary to increase accuracy at two positions in a single member. Namely, it is possible to suppress the accuracy demanded for members used for fixing the resolver 50 as a rotation angle detection sensor and for sealing the space in which the resolver 50 is disposed, so that there is an advantage that manufacture is facilitated.

In the embodiment, the cover 65 including the cooling medium supply unit 3 including the second cooling medium distribution passage 655 (see FIG. 4) and the cooling medium introduction member 40 including the cooling medium introduction passage 42 are formed as separate members. With this structure, in the case where foreign substances are included in the cooling medium supply unit 3 or the cooling medium introduction passage 42 to cause a trouble, for example, the cover 65 and the cooling medium introduction member 40 can be dismounted from each other to easily clean the cooling medium supply unit 3 or the cooling medium introduction passage 42, for example. As described above, the cover 65 and the cooling medium introduction member 40 are formed as separate members, and the path of the cooling medium can be split into short units, so that there is an advantage of the easy maintenance of the path of the cooling medium.

The space BS formed between the recess 65U of the cover 65 and the cooling medium introduction member 40 has the function of storing and holding the cooling medium supplied from the second cooling medium distribution passage 655. Therefore, the volume of the cooling medium reservoir 41 included in the cooling medium introduction member 40 can be substantially increased. As a result, the rotor and the stator of the motor 1 can be more stably cooled, or the rotational resistance of the rotor can be reduced by reducing the amount of the cooling medium stored in the oil reservoir portion 39.

The flange projection 64 includes a connector mounting hole 64H on which the connector 55 is mounted. The connector 55 is mounted on the connector mounting hole 64H across a sealing member 55S from the intra-projection space 641 side of the flange projection 64. Since the flange projection 64 is a part of the housing 6, the connector 55 is mounted on the housing 6. The connector 55 appearing from the connector mounting hole 64H is electrically connected to the connector terminal of the connector 55, and connects an external connector, which is connected to a controller of the motor 1. With this configuration, the controller can output the resolver 50 and excites the resolver 50.

In the embodiment, the size (the height of the projection space) of the intra-projection space 641 of the flange projection 64 between the cover 65 and an intra-projection space bottom 64B (the surface of the second flange 63 on the cover 65 side) is a sufficient size for mounting the connector 55. With this configuration, in the embodiment, the connector 55 is mounted on a wall 643A of the flange projection 64, and at least a part of the connector 55 can be disposed in the intra-projection space 641. Next, exemplary modifications of the embodiment will be described.

<An Exemplary Modification>

Figure 8:
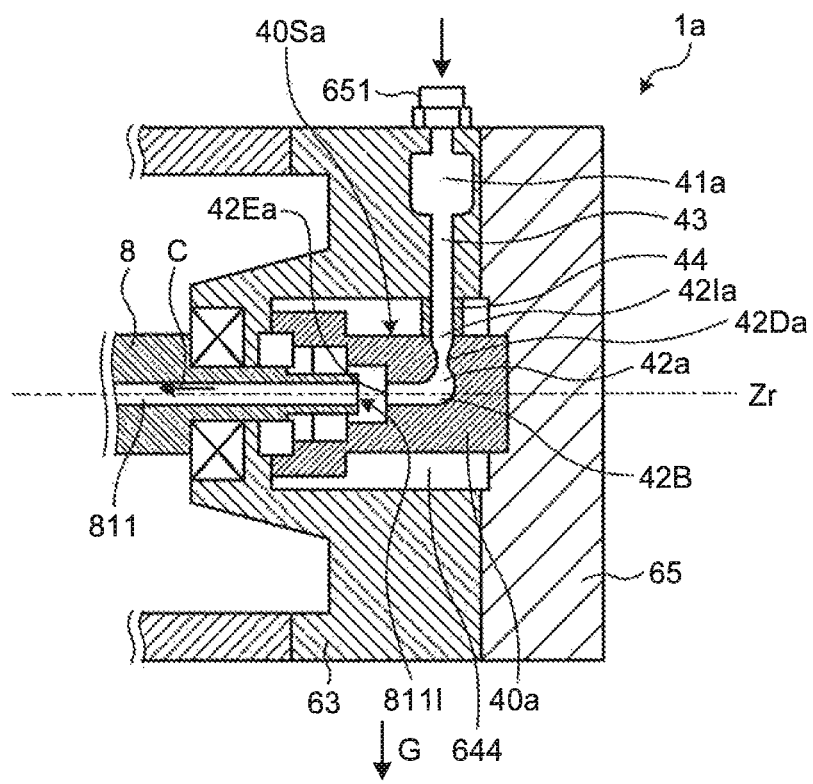
FIG. 8 is a partial cross sectional view of a motor according to an exemplary modification of the embodiment.

FIG. 8 is a partial cross sectional view of a motor according to an exemplary modification of the embodiment. A motor 1a is disposed in such a way that the rotational center axis Zr is orthogonal to the gravitational direction (in the direction indicated by arrow G illustrated in FIG. 8). A cooling medium introduction member 40a is disposed in a space 644 formed between the second flange 63 and the cover 65. A cooling medium reservoir 41a is provided in the second flange 63. The cooling medium reservoir 41a is supplied with a cooling medium from the cooling medium inlet 651. A passage 43 through which the cooling medium passes is connected to the bottom of the cooling medium reservoir 41a. The passage 43 is opened on the cooling medium reservoir 41a and the space 644.

The cooling medium introduction member 40a includes a cooling medium introduction passage 42a having a curved portion 42B and a restriction section 42Da. The cooling medium introduction passage 42a is opened on a side portion 40Sa of the cooling medium introduction member 40a in a cylindrical shape and on a portion of the cooling medium introduction member 40a opposite to the inlet 811I of the axial passage 811 included in the shaft 8. The cooling medium introduction passage 42a extends from the side portion 40Sa toward the rotational center axis Zr. The cooling medium introduction passage 42a changes the orientation at an angle of 90 degrees at the curved portion 42B at the position of the rotational center axis Zr, and extends along the rotational center axis Zr. The cooling medium introduction passage 42a includes the restriction section 42Da between the side portion 40Sa and the curved portion 42B. In the cooling medium introduction passage 42a, an opening 42Ia on the side portion 40Sa side is joined to the opening of the passage 43 on the space 644 side using a joining passage 44.

The motor 1a is disposed in such a way that the rotational center axis Zr is orthogonal to the gravitational direction or mounted on an object. In the disposition, the motor 1a is disposed in such a way that the cooling medium reservoir 41a is positioned on the upper part, for example. The cooling medium supplied from the cooling medium inlet 651 is stored in the cooling medium reservoir 41a, and flows into the cooling medium introduction passage 42a through the passage 43 and the joining passage 44 due to the action of gravity. The cooling medium flowing into the cooling medium introduction passage 42a flows out of an opening 42Ea through the restriction section 42Da, and flows into the inlet 811I of the axial passage 811.

The motor 1 according to the embodiment described above is used in a so-called a vertical position in which the rotational center axis Zr is disposed in parallel with the gravitational direction. On the contrary, the motor 1a according to the exemplary modification is used in a so-called horizontal position in which the rotational center axis Zr is disposed orthogonal to the gravitational direction. As described above, the motor 1a in a horizontal position includes the cooling medium reservoir 41a, so that the operation and effect as similar to the operation and effect of the motor 1 in a vertical position are exerted. The position of the restriction section 42Da included in the motor 1a is not limited to the example described above. For example, the restriction section 42Da may be provided on the downstream side of the passage 43 or the curved portion 42B in the flowing direction of the cooling medium.

<An Exemplary Modification of the Cooling Medium Introduction Member>

Figure 9:
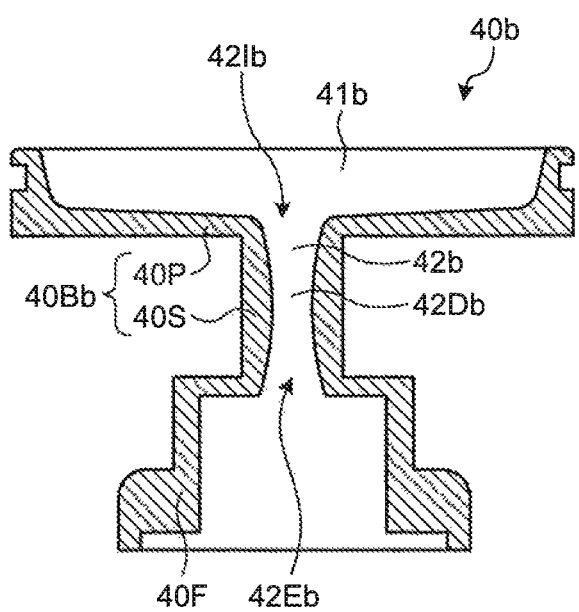
FIG. 9 is a cross sectional view of an exemplary modification of a cooling medium introduction member.

FIG. 9 is a cross sectional view of an exemplary modification of the cooling medium introduction member. The cooling medium introduction member 40 illustrated in FIGS. 4 and 7 is a member in a nearly cylindrical shape. A cooling medium introduction member 40b according to the exemplary modification is different in that the cooling medium introduction member 40b includes a cooling medium reservoir forming portion 40P in a nearly disk shape, a shell 40Bb including a shaft portion 40S in a cylindrical shape, and a protruding portion 40F. The cooling medium reservoir forming portion 40P includes a cooling medium reservoir 41b. The diameter of the cooling medium reservoir 41b is greater than the diameter of the cooling medium introduction member 40 illustrated in FIGS. 4 and 7, and the depth is shallower than the depth of the cooling medium introduction member 40.

The cooling medium reservoir forming portion 40P is joined to the protruding portion 40F using the shaft portion 40S. The diameter of the shaft portion 40S is smaller than the diameter of the cooling medium reservoir forming portion 40P. The shaft portion 40S includes a cooling medium introduction passage 42b penetrating from the cooling medium reservoir forming portion 40P toward the protruding portion 40F. The cooling medium introduction passage 42b includes a restriction section 42Db, an opening 42Ib opened on the cooling medium reservoir 41b, and an opening 42Eb opened on the inner side of the protruding portion 40F. Even the cooling medium introduction member 40b in this shape exerts the operation and effect similar to the operation and effect of the cooling medium introduction member 40 described above.

<A Structure of Supplying the Cooling Medium to the Bearing>

Figure 10:
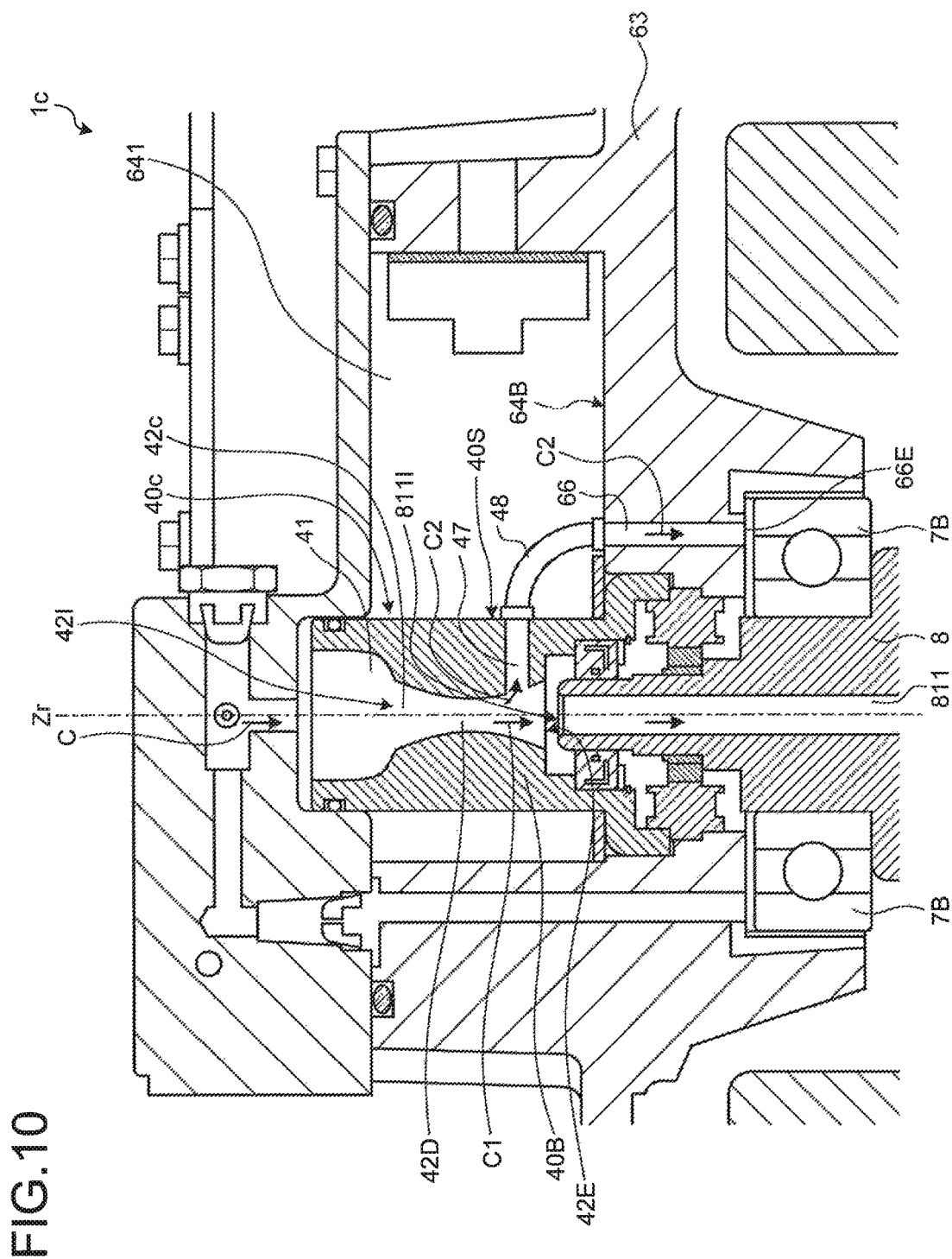
FIG. 10 is a partial cross sectional view of a motor in which a cooling medium stored in a cooling medium reservoir is supplied to one of bearings supporting a shaft.

FIG. 10 is a partial cross sectional view of a motor in which a cooling medium stored in a cooling medium reservoir is supplied to one of bearings supporting a shaft. A motor 1c supplies a part of a cooling medium stored in the cooling medium reservoir 41 included in the motor 1 illustrated in FIGS. 4 and 7 to the bearing 7B, which is one of the bearings supporting the shaft 8 on both sides in the longitudinal direction. The bearing 7B is mounted on the end portion side of the shaft 8 on which the inlet 811I of the axial passage 811 is opened. The bearing 7B rotatably supports the shaft 8 on the housing, more specifically on the second flange 63 on the cooling medium introduction member 40c side.

A cooling medium introduction passage 42c penetrates through a cooling medium introduction member 40c from the bottom of the cooling medium reservoir 41 toward the end portion of the cooling medium introduction member 40c opposite to the inlet 811I of the axial passage 811. The cooling medium introduction passage 42c is connected to a branch passage 47 on the downstream side of the restriction section 42D in the flowing direction of the cooling medium. The branch passage 47 extends in the inside of the cooling medium introduction member 40c in the direction crossing the rotational center axis Zr (in the modification, in the direction orthogonal to the rotational center axis Zr), and the branch passage 47 is opened on a side portion 40S of the cooling medium introduction member 40c. The branch passage 47 opened on the side portion 40S is connected to a joining passage 48 disposed in the intra-projection space 641.

The second flange 63 includes a passage 66 penetrating through the intra-projection space 641 and the position of the bearing 7B. The passage 66 is opened at the position opposite to the bearing 7B and opened in the intra-projection space 641. The joining passage 48 described above is connected to the passage 66 on the opposite side where the joining passage 48 is connected to the branch passage 47. With this structure, a part of the cooling medium in the cooling medium introduction passage 42c is supplied to the bearing 7B through the branch passage 47, the joining passage 48, and the passage 66. The branch passage 47, the joining passage 48, and the passage 66 function as bearing cooling medium passages that supply the cooling medium stored in the cooling medium reservoir 41 to the bearing 7B.

During the operation of the motor 1c, the cooling medium stored in the cooling medium reservoir 41 flows from the opening 42I into the cooling medium introduction passage 42c, and passes through the restriction section 42D. The cooling medium passing through the restriction section 42D flows into the opening 42E and the branch passage 47. The cooling medium flowing into the opening 42E (arrow C1) flows from the inlet 811I of the shaft 8 into the axial passage 811. The cooling medium flowing into the branch passage 47 (arrow C2) is supplied to the bearing 7B through the joining passage 48 and the passage 66, and the cooling medium cools and lubricates the joining passage 48 and the passage 66.

The motor 1c supplies the cooling medium stored in the cooling medium reservoir 41 also to the bearing 7B, so that the cooling medium can be stably supplied to the bearing 7B even though the supply of the cooling medium from the pump 21 illustrated in FIG. 6 is unstable. As a result, it is possible to suppress the insufficient lubrication and the insufficient cooling of the bearing 7B. The branch passage 47 is connected to the cooling medium introduction passage 42c on the downstream side of the restriction section 42D in the flowing direction of the cooling medium. However, the branch passage 47 may be connected to the cooling medium introduction passage 42c or the cooling medium reservoir 41 on the upstream side of the restriction section 42D in the flowing direction of the cooling medium. Namely, the cooling medium from the cooling medium reservoir 41 may be branched to the bearing 7B on the downstream side or the upstream side of the restriction section 42D in the flowing direction of the cooling medium.

As described above, the embodiment is described. However, the embodiment is not limited to the foregoing description. Moreover, the foregoing components include components that can be easily conceived by a person skilled in the art, substantially the same components, and components in the scope of so-called equivalents. Furthermore, the foregoing components can be appropriately combined. In addition, the components can be variously omitted, replaced, or modified within the scope not deviating from the teachings of the embodiment.

REFERENCE SIGNS LIST 1, 1a MOTOR
2 COOLING SYSTEM
6 HOUSING
7A, 7B BEARING

8 SHAFT
9 STATOR
10 HYBRID HYDRAULIC EXCAVATOR
39 OIL RESERVOIR PORTION
40, 40a, 40b, 40c COOLING MEDIUM INTRODUCTION MEMBER
40B, 40Bb SHELL PORTION
40P COOLING MEDIUM RESERVOIR FORMING PORTION
40S SHAFT PORTION
40S, 40Sa SIDE PORTION
40Ta, 40Tb END FACE
41, 41a, 41b COOLING MEDIUM RESERVOIR
42B CURVED PORTION
42D, 42Da, 42Db RESTRICTION SECTION
42E, 42Eb, 42I, 42Ib, OPENING
42, 42a, 42b, 42c COOLING MEDIUM INTRODUCTION PASSAGE
43 PASSAGE
44, 48 JOINING PASSAGE
47 BRANCH PASSAGE
50 RESOLVER
55 CONNECTOR
61 HOUSING SHELL
62 FIRST FLANGE
63 SECOND FLANGE
64 FLANGE PROJECTION
65 COVER
66 PASSAGE
82 ROTOR CORE
91 STATOR CORE
92 COIL
612 WATER JACKET
651 COOLING MEDIUM INLET
811 AXIAL PASSAGE
811I INLET
812 RADIAL PASSAGE
813 INTRA-SHAFT COOLING MEDIUM PASSAGE

The invention claimed is:

1. A motor comprising:
a shaft to which a rotor is attached and having an internal cooling medium passage in an inside of the shaft, a cooling medium passing through the internal cooling medium passage;
a housing including the shaft disposed therein and configured to rotatably support the shaft;
a cooling medium reservoir provided in the housing and provided on a rest system of an upstream side of an inlet of the internal cooling medium passage in a flowing direction of the cooling medium, the cooling medium reservoir being configured to store the cooling medium and then flow the cooling medium to the internal cooling medium passage,
wherein the cooling medium reservoir is provided on a rotational center axis of the shaft, and the rotational center axis is in parallel with a gravitational direction, and the cooling medium reservoir is provided with a restriction section which has an internal diameter which gradually reduces in diameter along a length to a minimum diameter followed by increasing in diameter before connecting to the internal cooling medium passage.

2. The motor according to claim 1, wherein a passage including a restriction section is provided between the cooling medium reservoir and the internal cooling medium passage.

3. The motor according to claim 2, further comprising:
a cooling medium inlet provided on the housing and configured to introduce the cooling medium into the cooling medium reservoir; and
a cooling medium introduction member that is a member disposed between the cooling medium inlet and the inlet, in which the cooling medium reservoir is provided on a side of the cooling medium inlet, and the passage penetrates from the cooling medium reservoir toward the inlet.

4. The motor according to claim 3, further comprising a rotation angle detection sensor mounted on an end portion side of the shaft, the end portion at which the inlet is opened, the rotation angle detection sensor being configured to detect a rotation angle of the shaft,
wherein the cooling medium introduction member presses the rotation angle detection sensor from the end portion side of the shaft.

5. The motor according to claim 1, wherein:
the shaft is supported on the housing on both sides in a longitudinal direction through a bearing; and
the motor further comprises a bearing cooling medium passage configured to supply the cooling medium stored in the cooling medium reservoir to the bearing on an end portion side of the shaft at which the inlet is opened.

6. A motor comprising:
a shaft to which a rotor is attached and having an internal cooling medium passage in an inside of the shaft, a cooling medium passing through the internal cooling medium passage;
a housing including the shaft disposed therein and configured to rotatably support the shaft;
a cooling medium reservoir provided in the housing and provided on an upstream side of an inlet of the internal cooling medium passage in a flowing direction of the cooling medium, the cooling medium reservoir being configured to store the cooling medium and then flow the cooling medium to the internal cooling medium passage;
a cooling medium inlet provided on the housing and configured to introduce the cooling medium into the cooling medium reservoir; and
a cooling medium introduction member that is a member disposed between the cooling medium inlet and the inlet, in which the cooling medium reservoir is provided on a side of the cooling medium inlet, and a passage including a restriction section penetrates from the cooling medium reservoir toward the inlet, and the cooling medium reservoir being provided with the restriction section which has an internal diameter which gradually reduces in diameter along a length to a minimum diameter followed by increasing in diameter before connecting to the internal cooling medium passage.

* * * * *